United States Patent
Ellis et al.

(10) Patent No.: US 7,232,023 B2
(45) Date of Patent: Jun. 19, 2007

(54) CHUTE AND CHUTE LINER

(75) Inventors: Peter Ellis, Johannesburg (ZA); Melvyn George King, Johannesburg (ZA)

(73) Assignee: Brelko Patents (Pty) Ltd., Selby Johannesburg (ZA)

( * ) Notice: Subject to any disclaimer, the term of this patent is extended or adjusted under 35 U.S.C. 154(b) by 0 days.

(21) Appl. No.: 11/393,920

(22) Filed: Mar. 31, 2006

(65) Prior Publication Data
US 2006/0237280 A1  Oct. 26, 2006

(30) Foreign Application Priority Data
Apr. 1, 2005  (ZA)  .............................. 2005/02682

(51) Int. Cl.
*B65G 11/00* (2006.01)
(52) U.S. Cl. ........................................ 193/2 R; 193/33
(58) Field of Classification Search ................ 193/2 R, 193/4, 25 A, 25 E, 32, 33; 198/550.01
See application file for complete search history.

(56) References Cited

U.S. PATENT DOCUMENTS

| | | | | |
|---|---|---|---|---|
| 5,184,706 A * | 2/1993 | Christenson | ................ | 193/2 R |
| 5,480,018 A * | 1/1996 | Sasaki | ........................ | 193/2 R |
| 5,735,377 A * | 4/1998 | Herren | ........................ | 193/33 |
| 6,041,906 A * | 3/2000 | Howard | ...................... | 193/2 R |
| 6,279,715 B1* | 8/2001 | Herren | ........................ | 193/33 |
| 6,684,999 B1* | 2/2004 | Howard | ...................... | 193/2 R |

\* cited by examiner

*Primary Examiner*—James R. Bidwell
(74) *Attorney, Agent, or Firm*—George H. Spencer; Dennison, Schultz & MacDonald

(57) ABSTRACT

A chute liner which has an elongate body which is formed from a resilient shock-absorbing material and which has an inner side and an outer side, at least one locating formation on the inner side, and at least one elongate flange which is located at least on one side of the locating formation and a chute wherein a plurality of chute liners are engaged with a wall of the chute.

17 Claims, 4 Drawing Sheets

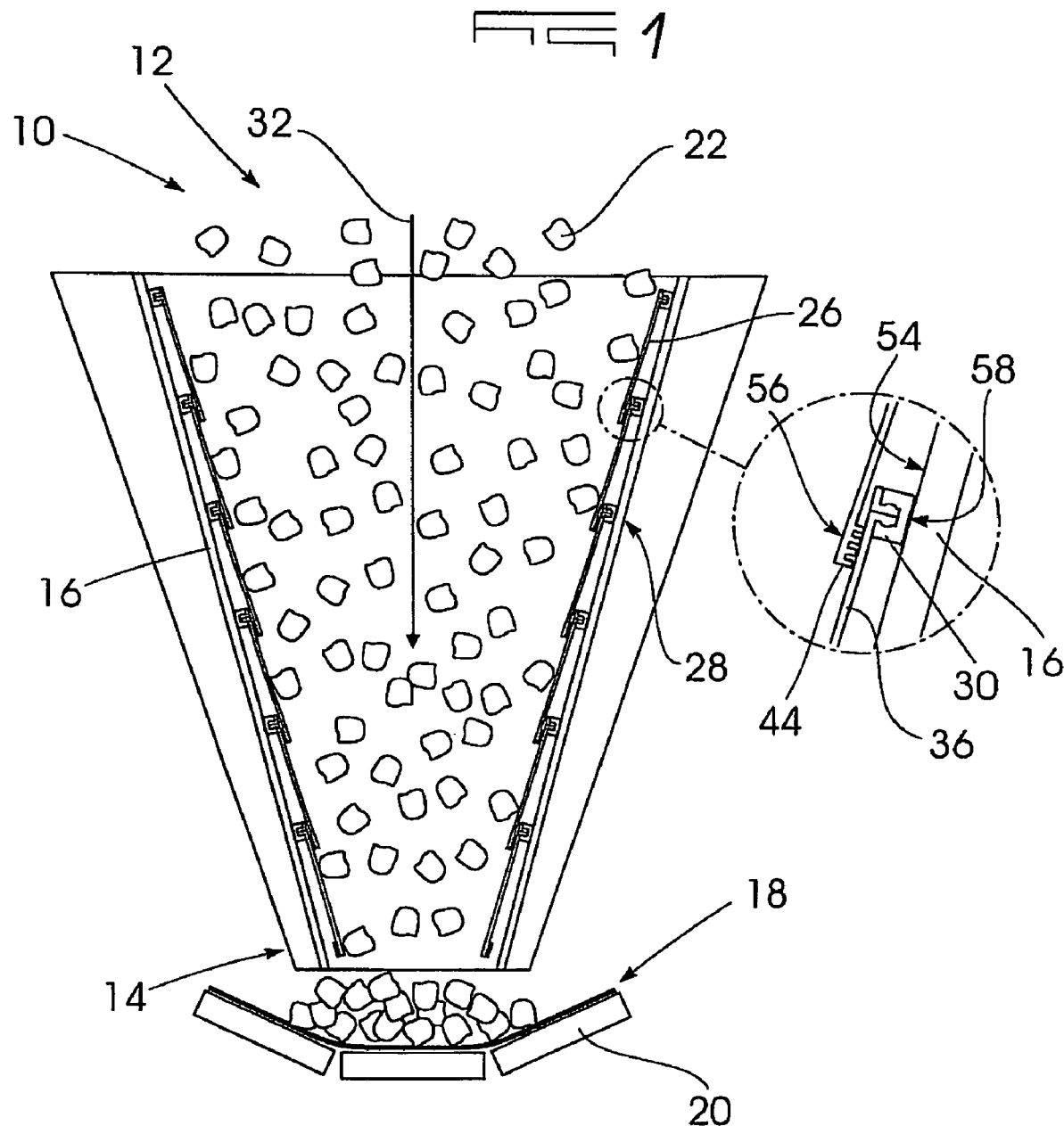

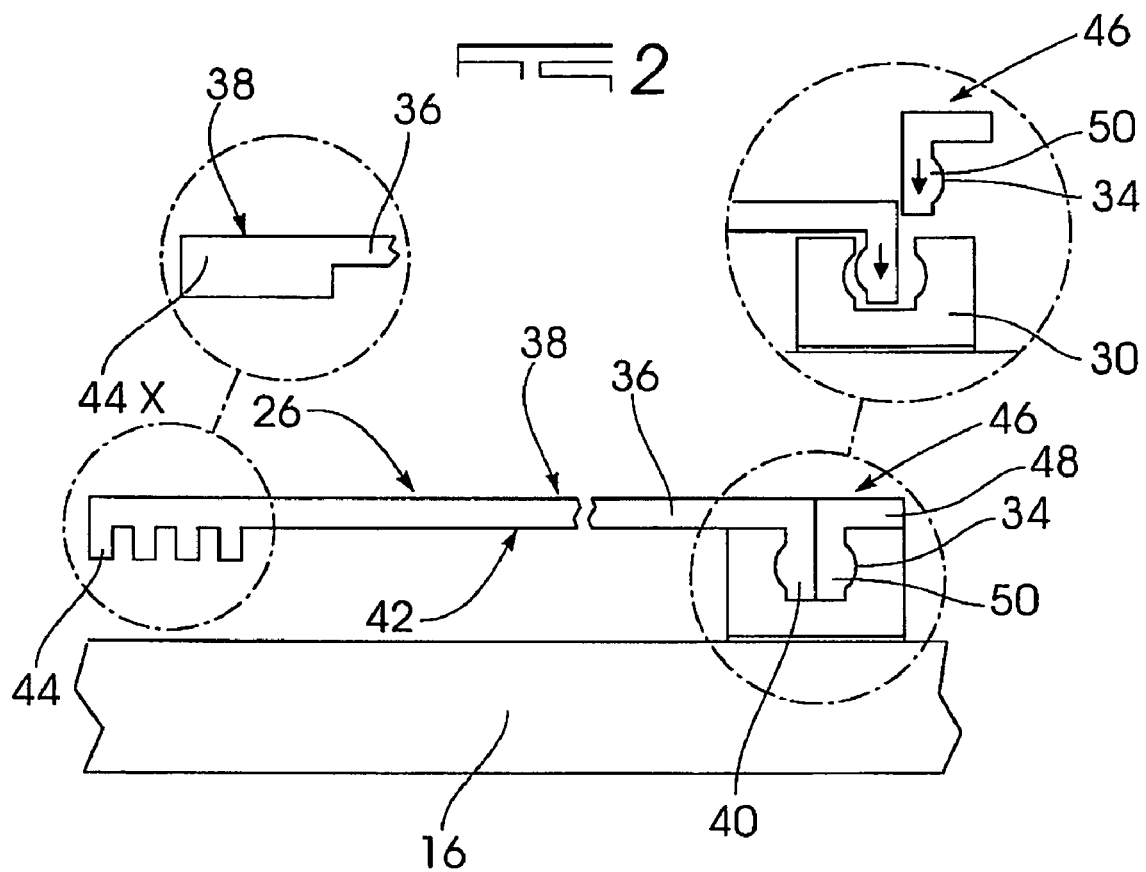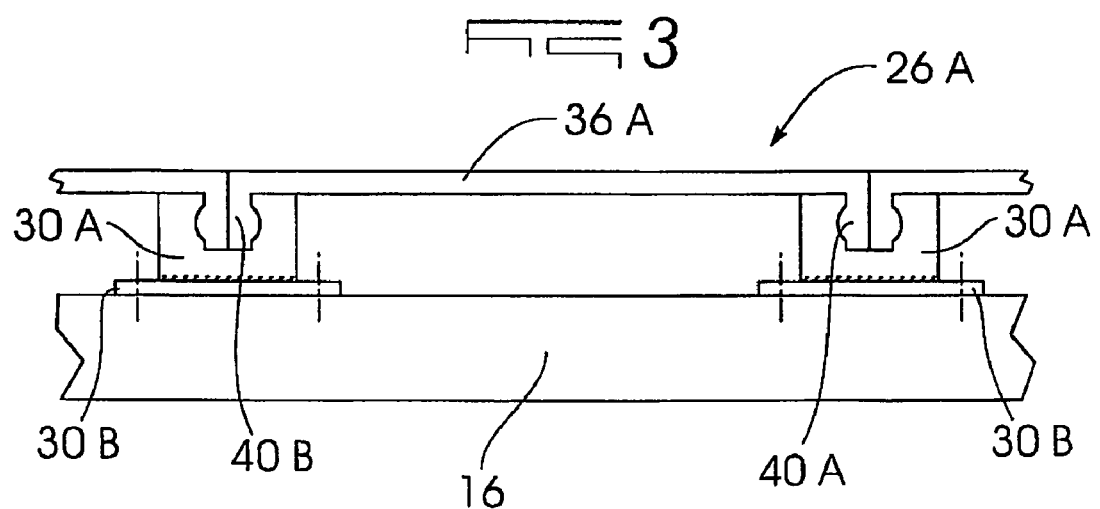

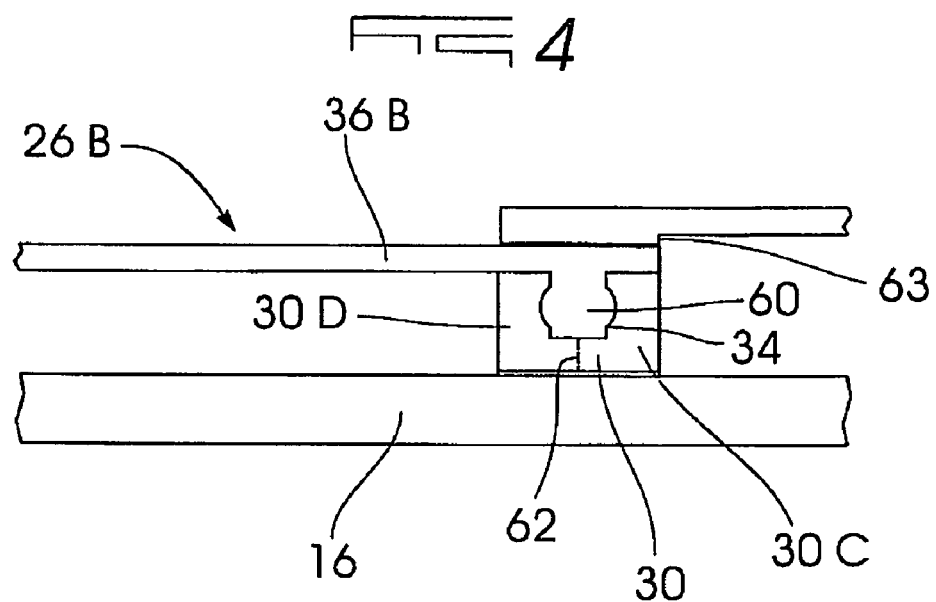
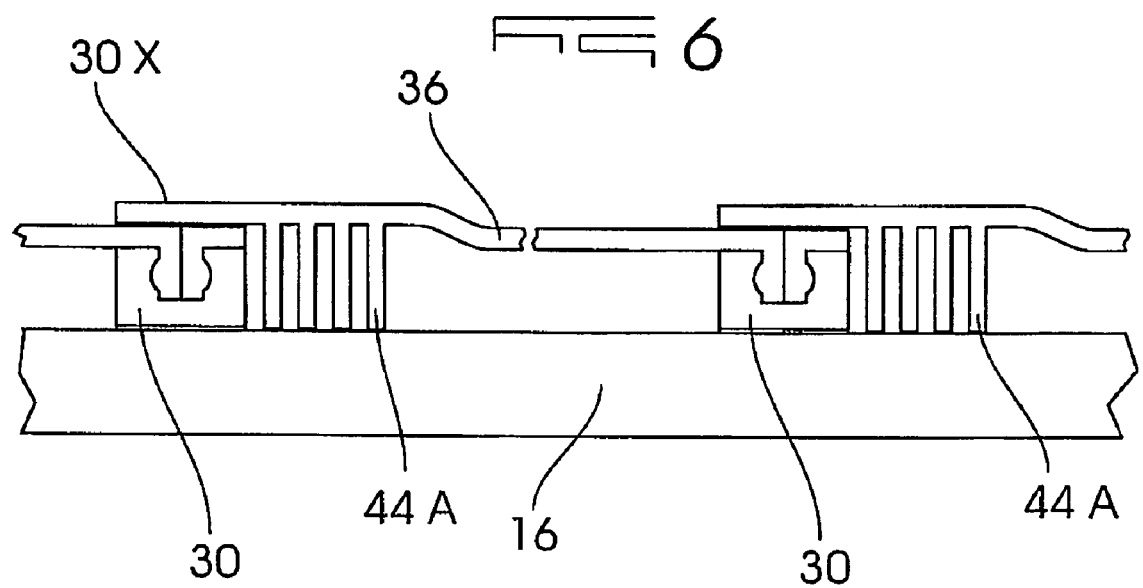

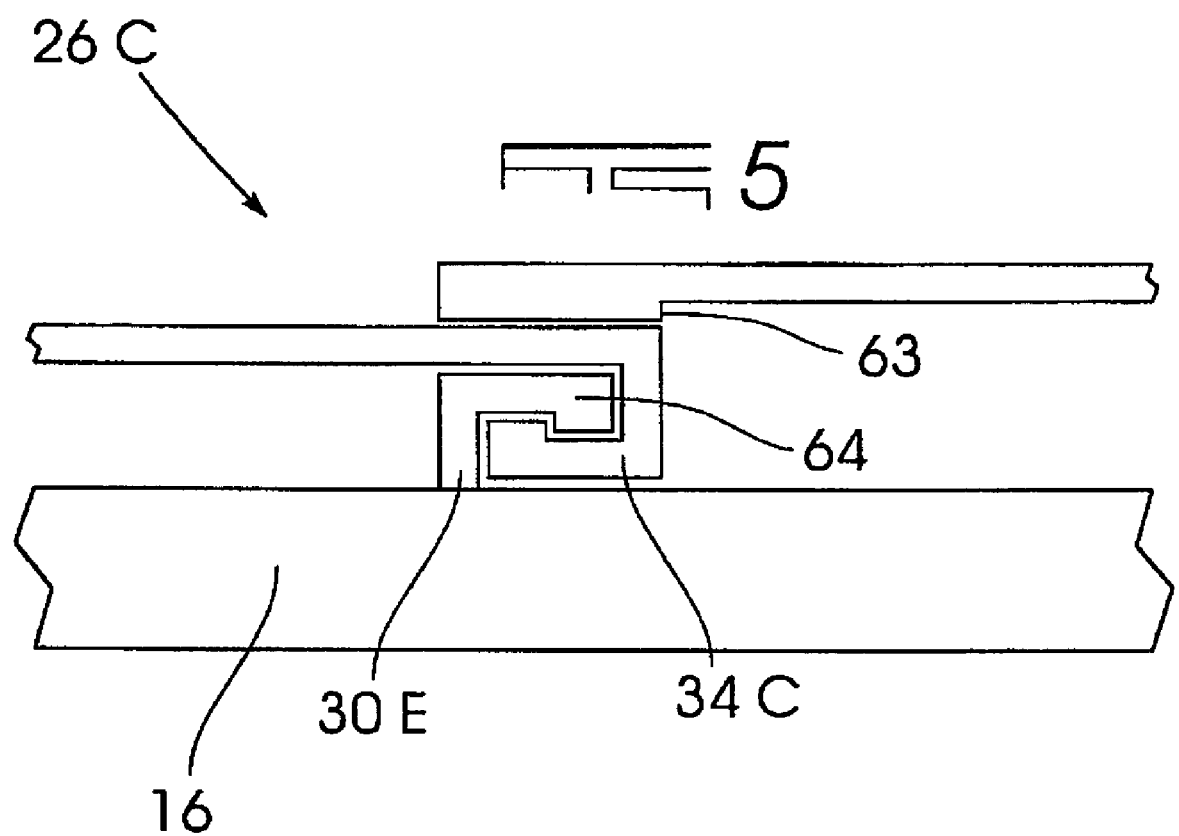

CHUTE AND CHUTE LINER

BACKGROUND OF THE INVENTION

This invention relates generally to a chute and more particularly is concerned with lining a chute in order to protect the chute against damage and to prevent material build-up on a side of the chute.

Material such as ore and rock, which is to be loaded onto a conveyor belt, can be guided from a discharge hopper by a chute onto an upwardly facing surface of the conveyor belt. This type of arrangement works satisfactorily but in certain conditions the chute can be subjected to considerable wear and tear. A further factor is that the material may include sticky constituents which build up on a wall of the chute. With time this material hardens and, in order to remove it from the chute, considerable effort is required.

SUMMARY OF INVENTION

The invention provides a chute liner which includes an elongate body which is formed from a resilient shock-absorbing material and which has an inner side and an outer side, at least one locating formation on the inner side, and at least one elongate flange which is located at least on one side of the locating formation.

In one form of the invention at least two locating formations are provided. These formations may be spaced apart or be parallel to each other and the flange may be located at least between the locating formations.

The chute liner may include a locking member with an undercut formation which, in use of the locking member, is adjacent the locating formation. The undercut formation is preferably elongate. The locating formation is preferably elongate.

The invention further extends to a chute which includes a wall with an inlet side and an outlet side, a plurality of fixing formations on the wall, and a plurality of liners, each liner including at least one locating formation which is engaged with a respective fixing formation, and a flange which extends from the locating formation.

The flange may partly overlie a locating formation of an adjacent liner.

The inlet is normally higher than the outlet and the fixing formations may be positioned substantially parallel to each other at spaced intervals between the inlet and the outlet.

Each fixing formation may be defined by at least part of a fixing member which is secured to the wall.

The flange of each respective liner may be flexible and may be spaced at least partly from the wall.

The invention also provides a chute which includes a wall with an inlet side and an outlet side, and a plurality of liners which are fixed to the wall, each liner being made from a resilient shock-absorbing material and including a flange, which preferably is planar, which is at least partly spaced from an opposed surface of the wall.

BRIEF DESCRIPTION OF THE DRAWINGS

The invention is further described by way of examples with reference to the accompanying drawings in which:

FIG. 1 is a cross sectional view of a chute according to one form of the invention;

FIG. 2 illustrates in cross section a chute liner for use with the chute of FIG. 1;

FIG. 3 shows a modified chute liner according to the invention; and

FIGS. 4, 5 and 6 respectively illustrate variations of the invention.

DESCRIPTION OF PREFERRED EMBODIMENTS

FIG. 1 of the accompanying drawings illustrates a chute 10 according to the invention which includes an inlet side 12 and an outlet side 14. The chute is tapered downwardly from the inlet to the outlet and has side walls 16 formed from a suitable material e.g. wear-resistant steel.

The outlet 14 is positioned above a conveyor belt 18 which is supported on idlers 20. The arrangement is such that material 22 from a discharge hopper, not shown, is allowed to fall into the inlet 12 and the chute then guides the material to the conveyor belt 18. This type of operation is known and therefore is not further described herein.

Each wall 16 is protected by means of a plurality of chute liners 26. FIG. 1 includes an inset drawing which shows a junction 28, between adjacent chute liners, while FIG. 2 shows a chute liner 26 on an enlarged scale with a first inset drawing to FIG. 2 showing the manner in which the chute liner is fixed to a wall 16, and a second inset drawing depicting a possible modification to the liner.

A plurality of fixing members 30 are attached to each wall 16 positioned at regularly spaced intervals, parallel to one another, between the inlet 12 and the outlet 14. Each fixing member extends more or less at a right angle to a vertical 32, which is the direction in which material is discharged into the chute. Each fixing member includes an undercut fixing formation 34, see particularly FIG. 2, which extends in the longitudinal direction of the fixing member.

Each liner 26 is made from a suitable shock-absorbing resilient material such as polyurethane or rubber and includes a flange 36 which has a substantially planar outer surface 38 and a locating formation 40 which extends along one side of the flange. The formation 40 is complemental in shape to half of a respective fixing formation 34. In this embodiment the flange 36, on an under surface 42, includes a plurality of spaced ribs 44.

In order to secure the flange to the chute the locating formation 40 is simply pressed into the formation 34 and, thereafter, a locking member 46 is used to secure the liner to the chute in such a way that it cannot easily be removed from the chute. The locking member 46 includes a short rib 48 which, in use, is co-planar with the flange 36, and a locking formation 50 which is substantially the same as the locating formation 40.

The parts 26 and 46 are made, as noted, from a resilient material and once the formation 40 is inserted into the formation 34 the locking member is forced into position as is indicated in the inset drawing in FIG. 2 using for example a hammer to fix the components together. During this process the formations 40 and 50 are distorted by being compressed and then expand.

Referring again to FIG. 1 it can be seen that each flange 36 is spaced from an opposed surface 54 of a side wall 16. Also a lower end of each flange, designated 56, overlies an adjacent upper edge 58 of a lower liner thereby effectively shielding the attachment components. The ribs 44 lift the flange from the upper surface of an adjacent flange.

When the material 22 is discharged into the chute a proportion of the material impacts on the liners. As these liners are made from shock-absorbing material they protect the chute to a considerable extent from physical damage which could be caused by direct impact of the material onto the walls of the chute. Also, as the liners are flexible they tend to vibrate and this helps to displace sticky material which otherwise would be inclined to adhere to the chute liners.

If a liner has to be replaced then this can readily be done by levering the locking member 46 out of engagement with the corresponding fixing member 30. Due to the modular type construction it is only necessary to replace those liners which are worn or damaged and it is not required to replace all of the liners at the same time.

Each liner shown in FIGS. 1 and 2 has a number of the ribs 44, which are relatively small. In some installations the spaced ribs can restrict movement of the flange 36 for the ribs may have a tendency to hook on, or engage frictionally with, an adjacent liner. This adverse effect can be partly or totally overcome by replacing the ribs with a single relatively large "block formation" 44X shown in a second inset drawing in FIG. 2.

FIG. 3 illustrates a variation of the invention wherein a liner 26A is designed to extend between, and to be fixed to, adjacent fixing members 30. The liner 26A includes a central flange 36A which is flanked on opposing sides by locating formations 40A and 40B respectively each of which is substantially the same as the formation 40 shown in FIG. 2. Consequently, in this embodiment, use is not made of a separate locking member 46, to secure a liner in position, for the locking function is fulfilled by adjacent pairs of liners working in unison.

The material, and construction, of each fixing member may vary according to requirement. For example each fixing member may be extruded from a suitable material such as aluminium or a wear-resistant plastics, or it may be cast or moulded for example from polyurethane. One possible form of construction is shown in FIG. 3 wherein the member, marked 30A, is moulded from polyurethane and is cast so that it adheres to a steel mounting plate 30B, possibly formed with holes or other keying formations, to ensure a strong bond between the plastic and the metal. The plate 30B can be welded or bolted to the wall of the chute at a chosen location. Another possibility, irrespective of the material and construction of the fixing member, is to bolt the member to the wall of the chute using countersunk bolts, located on a centre line 30B inside the formation 34.

FIG. 4 illustrates a modified liner 26B. An integral locating formation 60 is formed at one side of a flange 36B. The formation 60 is complemental in shape to the undercut formation 34 in the fixing member 30. The formation 60 may be designed to facilitate easy engagement with the fixing member 30. It is also possible to form the fixing member with a split along a dotted line 62 so that it consists of two halves 30C and 30D respectively which can be clamped together, when required, to engage with the formation 60. The flange 36B at its edge which overlies the formation 60 of an adjacent liner is thickened on its underside 63 to provide a degree of reinforcement at this contact surface.

FIG. 5 shows another variation wherein each fixing member, designated 30E, is formed from a length of angle iron with a bead 64 on one limb of the angle iron. The liner, designated 26C, has a complemental formation 34C which clips over the bead with a tight compression fit. As before, adjacent liners partly overlie one another to ensure that continuous protection is provided for the underlying wall 16. Again, each liner is reinforced along a peripheral contact surface 63.

FIG. 6 illustrates another modification which can be made to the liner. The flange 36 has ribs 44A which are fairly long and which contact an inner surface of the chute wall 16, adjacent an inner and upper surface of a fixing member 30. The liner is firmly fixed to the chute along an upper edge but, at a lower edge, the liner is afforded some support, directly by the chute, via the ribs, and by the next, lower fixing member which reacts against a lower edge 30X of the flange, with the nature of the support being such that the liner is still able to flex under impact. The flange 36 can also be stepped so that a "nesting" configuration results when the liners are attached to the chute. This could possibly reduce liner wear.

The liners are preferably cut to a desired size from relatively long rolls of material, so that join lines are avoided, or at least reduced in number. This requirement is not a constraint in respect of the locking members 46 which, by contrast, can be relatively short.

Preferably the liners are formed from extruded material, although they can be moulded. In the latter instance the nature of the locating formation 40, and of the locking member 46, can be changed. The formation 40 need not be continuous, for it could be replaced by a plurality of spigots for example. Similarly, for example, the member 46 could also be replaced by a number of discrete fasteners.

The invention claimed is:

1. A chute liner which includes an elongate body which is formed from a resilient shock-absorbing material and which has an inner side and an outer side, at least one locating formation on the inner side and projecting from the inner side, and at least one elongate flange which is located at least on one side of the locating formation.

2. The chute liner according to claim 1, wherein the locating formation is elongate.

3. The chute liner according to claim 2, wherein the body has at least two elongate locating formations which are spaced apart and the flange is located at least between the locating formations.

4. The chute liner according to claim 1, wherein the shock-absorbing material is at least one of the following: polyurethane and rubber.

5. The chute liner according to claim 1, wherein the flange has an outer surface which is planar.

6. A chute liner which includes an elongate body which is formed from a resilient shock-absorbing material and which has an inner side and an outer side, at least one locating formation on the inner side, at least one elongate flange which is located at least on one side of the locating formation and a locking member with an undercut formation which, in use of the locking member, is adjacent the locating formation.

7. The chute liner according to claim 6, wherein the undercut formation is elongate.

8. A chute liner which includes an elongate body which is formed from a resilient shock-absorbing material and which has an inner side and an outer side, at least one locating formation on the inner side and at least one elongate flange which is located at least on one side of the locating formation, and which has an under surface and at least one rib formation on the under surface.

9. A chute which includes a wall with an inlet side and an outlet side, a plurality of fixing formations on the wall, and a plurality of liners, each liner including at least one locating formation which is engaged with a respective fixing formation, and a flange which extends from the locating formation and wherein the flange of one liner partly overlies a locating formation of an adjacent liner.

10. The chute according to claim 9, wherein the fixing formations are positioned substantially parallel to each other at spaced intervals between the inlet and the outlet.

11. The chute according to claim 9, wherein each fixing formation is at least partly formed by a fixing member which is secured to the wall.

12. The chute according to claim 11, wherein each fixing member is made from metal, or a plastics material, or a combination thereof.

13. The chute according to claim 9, wherein the flange of each liner is flexible and is spaced at least partly from the wall.

14. The chute according to claim 9, wherein the fixing formations extend on the wall at a right angle to a vertical.

15. The chute according to claim 9, wherein the flange of each liner has a substantially planar outer surface.

16. A chute which includes a wall with an inlet side and an outlet side, a plurality of fixing formations on the wall, and a plurality of liners, each liner including at least one locating formation which is engaged with a respective fixing formation, and a flange which extends from the locating formation, wherein each fixing formation is at least partly formed by a fixing member which is secured to the wall and wherein the fixing member is elongate and has an undercut formation which extends in a longitudinal direction of the fixing member.

17. The chute according to claim 16, wherein the undercut formation is at least partly complementary in shape to at least part of the locating formation.

* * * * *